United States Patent [19]
Castegnier et al.

[11] Patent Number: 5,928,417
[45] Date of Patent: Jul. 27, 1999

[54] ELECTROCOAGULATION PRINTING INK

[75] Inventors: Adrien Castegnier, Outremont; Normand Lepine, Pointe-aux-Trembles, both of Canada

[73] Assignee: Elcorsy Technology Inc., Saint-Laurent, Canada

[21] Appl. No.: 08/922,257

[22] Filed: Sep. 2, 1997

Related U.S. Application Data

[63] Continuation-in-part of application No. 08/829,787, Mar. 31, 1997, abandoned.
[51] Int. Cl.$^6$ .............................. C09D 11/02; C09D 11/10
[52] U.S. Cl. .................. 106/31.87; 106/31.6; 106/31.72; 106/31.82; 106/31.86; 106/31.89; 523/161
[58] Field of Search ........................ 523/161; 106/31.89, 106/31.6, 31.72, 31.82, 31.87

[56] References Cited

U.S. PATENT DOCUMENTS

| | | | |
|---|---|---|---|
| 4,895,629 | 1/1990 | Castegnier | 204/180.9 |
| 5,690,801 | 11/1997 | Castegnier | 204/486 |
| 5,693,129 | 12/1997 | Lin | 106/31.43 |

*Primary Examiner*—Tae Yoon
*Attorney, Agent, or Firm*—Swabey Ogilvy Renault

[57] ABSTRACT

The shelf-life of an electrocoagulation printing ink consisting essentially of a liquid colloidal dispersion containing an electrolytically coagulable colloid, a dispersing medium, a soluble electrolyte, a pigment and a dispersing agent uniformly dispersing said pigment into the dispersion, is increased by selecting as the dispersing agent an alkali metal salt of a naphthalenesulfonic acid-formaldehyde polycondensate having the general formula:

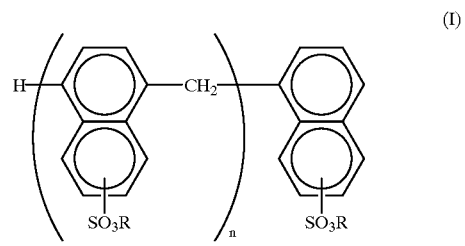

in which R is an alkali metal and n is an integer ranging from about 5 to about 12.

57 Claims, No Drawings

ELECTROCOAGULATION PRINTING INK

CROSS-REFERENCE TO RELATED APPLICATIONS

This application is a continuation-in-part of U.S. patent application Ser. No. 08/829,787, filed Mar. 31, 1997, now abandoned.

BACKGROUND OF THE INVENTION

The present invention pertains to improvements in the field of electrocoagulation printing. More particularly, the invention relates to an improved electrocoagulation printing ink.

In U.S. Pat. No. 4,895,629 of Jan. 23, 1990, Applicant has described a high-speed electrocoagulation printing method and apparatus in which use is made of a positive electrode in the form of a revolving cylinder having a passivated surface onto which dots of colored, coagulated colloid representative of an image are produced. These dots of colored, coagulated colloid are thereafter contacted with a substrate such as paper to cause transfer of the colored, coagulated colloid onto the substrate and thereby imprint the substrate with the image. As explained in this patent, the positive electrode is coated with a dispersion containing an olefinic substance and a metal oxide prior to electrical energization of the negative electrodes in order to weaken the adherence of the dots of coagulated colloid to the positive electrode and also to prevent an uncontrolled corrosion of the positive electrode. In addition, gas generated as a result of electrolysis upon energizing the negative electrodes is consumed by reaction with the olefinic substance so that there is no gas accumulation between the negative and positive electrodes.

The dispersion containing the olefinic substance and the metal oxide is applied onto the surface of the positive electrode in a manner so as to form on the electrode surface micro-droplets of olefinic substance containing the metal oxide. As described in the aforementioned patent, this may be achieved by means of a device comprising a rotatable brush provided with a plurality of radially extending horsehair bristles having extremities contacting the electrode surface, and a distribution roller arranged in spaced-apart parallel relation to the brush such as to contact the bristles thereof at their extremities The distribution roller has a plurality of peripheral longitudinally extending grooves and is partially immersed in a bath containing the dispersion. As the distribution roller rotates in the dispersion, the grooves are filled with the dispersion which is thus transferred to the bristles to coat the extremities thereof. Rotation of the brush, on the other hand, causes the coated bristles to transfer the dispersion onto the surface of the positive electrode and thereby form the desired micro-droplets of olefinic substance containing the metal oxide. Instead of a brush, use can be made of a roller provided with a plurality of radially extending strips of chamois leather adapted to contact the electrode surface, the strips being coated in the same manner as the bristles. Rotation of such a roller causes the coated strips to impinge upon the surface of the positive electrode such as to transfer thereon the dispersion and thereby form the desired micro-droplets of olefinic substance containing the metal oxide.

The electrocoagulation printing ink which is used to fill the gap defined between the positive and negative electrodes consists essentially of a liquid colloidal dispersion containing an electrolytically coagulable colloid, a dispersing medium, a soluble electrolyte and a coloring agent. The coloring agent can be a dye or a pigment. After coagulation of the colloid, any remaining non-coagulated colloid is removed from the surface of the positive electrode, for example, by scraping the surface with a soft rubber squeegee, so as to fully uncover the colored, coagulated colloid which is thereafter transferred onto the substrate. The surface of the positive electrode is thereafter cleaned by means of a plurality of rotating brushes and a cleaning liquid to remove any residual coagulated colloid adhered to the surface of the positive electrode.

Where the coloring agent used is a pigment, it is necessary to add a dispersing agent for uniformly dispersing the pigment into the ink. When using dispersing agents such as the non-ionic dispersing agent sold by ICI Canada Inc. under the trademark SOLSPERSE 27000, Applicant has observed that the pigment particles settle out after the ink has been left standing for more than 24 hours, resulting in a phase separation requiring mechanical agitation to re-disperse the pigment in the ink. The use of such a dispersing agent has also been found to cause an increase in the viscosity of the ink to above 500 cp, a reduction of the optical density of the coagulated colloid to about 1.20–1.25 as well as formation on the electrocoagulation printed images of an undesirable colored background having an optical density as high as 0.07. In addition, this dispersing agent causes an undesirable gas generation at the negative electrodes.

SUMMARY OF THE INVENTION

It is therefore an object of the present invention to overcome the above drawbacks and to provide an improved electrocoagulation printing ink which has an increased shelf-life and a viscosity in the range of about 300–400 cp, and which enables one to increase the optical density of the coagulated colloid and to reduce the optical density of the colored background on electrocoagulation printed images as well as the gas generation at the negative electrodes.

According to the present invention, there is provided in an electrocoagulation printing ink consisting essentially of a liquid colloidal dispersion containing an electrolytically coagulable colloid a dispersing medium, a soluble electrolyte, a pigment and a dispersing agent uniformly dispersing the pigment into the dispersion, the improvement wherein the dispersing agent is an alkali metal salt of a naphthalenesulfonic acid-formaldehyde polycondensate having the general formula:

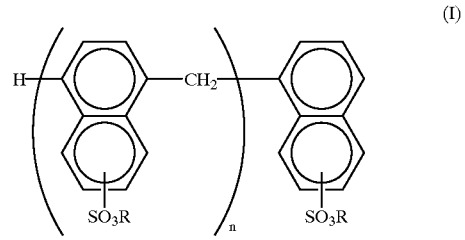

in which R is an alkali metal and n is an integer ranging from about 5 to about 12.

Applicant has found quite unexpectedly that by selecting as the aforesaid dispersing agent a naphthalenesulfonic acid-formaldehyde polycondensate alkali metal salt of the above formula (I), the shelf-life of the electrocoagulation printing ink is increased to at least several months and the ink viscosity ranges from about 300 to about 400 cp. Moreover, the use of the polymer of formula (I) enables one to increase the optical density of the coagulated colloid to about 1.40–1.50, to reduce the optical density of the colored background on electrocoagulation printed images to about 0.02 and also to significantly reduce the gas generation at the negative electrodes.

DESCRIPTION OF PREFERRED EMBODIMENTS

The pigment is preferably used in an amount of about 6.5 to about 15% by weight, and the dispersing agent in an amount of about 0.1 to about 2% by weight, based on the total weight of the ink. Use can be made of the pigments which are available from CABOT CORP. such as Carbon Black Monarch® 120 for imparting a black color to the colloid, or those available from HOECHST such as Hostaperm Blue B2G or B3G for imparting a cyan color, Permanent Rubine F6B or L6B for imparting a magenta color and Permanent Yellow DGR or DHG for imparting a yellow color to the colloid. The dispersing agent used in preferably an anionic polymer of formula (I) in which R is sodium and n is 7. Such a polymer is sold by Boehme Filatex Canada Inc. under the trade-mark CLOSPERSE 2500 and has a weight average molecular weight of about 2000.

According to a preferred embodiment of the invention, the ink further includes a sequestering agent for complexing metal ions generated during electrocoagulation printing The sequestering agent is present in an amount to prevent the metal ions from causing the colloid to undergo undesirable cross-linking, without adversely affecting electrocoagulation of the colloid. As explained in Applicant's copending U.S. patent application No. 08/376,245 filed Jan. 23, 1995, where a positive electrode made of stainless steel or aluminum is utilized in Applicant's electrocoagulation printing method, dissolution of the passive oxide film on such an electrode generates $Fe^{3+}$ or $Al^{3+}$ ions which then initiate coagulation of the colloid. Metal ions such as the trivalent ions $Fe^{3+}$ and $Al^{3+}$, on the other hand, are very efficient bridging agents for cross-linking colloids, particularly polyacrylamides. Applicant has found through analysis of various ink samples taken at different printing stages and time intervals that the ink contains iron or aluminum ions depending on whether the positive electrode used is made of stainless steel or aluminum and that the concentration of these metal ions increases in time during electrocoagulation printing. These metal ions are believed to be generated by the friction of the aforementioned bristles or chamois leather strips on the surface of the positive electrode as well as by the friction of the cleaning brushes used for cleaning the latter. Minor leaks from the system used for removing non-coagulated ink from the positive electrode surface after electrocoagulation of the colloid has taken place, which contains iron or aluminum ions released from the positive electrode surface but not consumed by coagulation of the colloid, also contaminate the ink. In addition, the paper onto which the dots of coagulated colloid are transferred contains metal ion contaminants and these are released onto the positive electrode surface upon contact of the paper with the latter. All these metal ion contaminants cross-link the colloid contained in the ink, resulting in a viscosity increase leading to an ultimate gelation of the ink.

The amount of sequestering agent necessary to prevent the metal ions generated during the electrocoagulation printing from causing an undesirable cross-linking of the colloid depends on the sequestering agent used as well as on the concentration of metal ions which causes an undesirable cross-linking of the colloid and which, in turn, depends on the type of colloid contained in the ink. The amount of sequestering agent added, on the other hand, should not adversely affect the electrocoagulation of the colloid since a too large quantity may also complex the metal ions which are released from the positive electrode surface during passive film breakdown and which are essential to the coagulation of the colloid. Applicant has found that, for most colloids, when the concentration of ferric ions which cause the colloid to cross-link is generally above 25 ppm, the ink is too viscous for proper working and, at about 140 ppm, there is gelation of the ink. Thus, according to a preferred embodiment of the invention, the sequestering agent is added in an amount such that no more than about 20 ppm, and preferably no more than about 15 ppm, of ferric ions cause the colloid to cross-link. Therefore, the concentration of complexed metal ions in the ink may be quite high and reach several hundred ppm, provided that in Applicant's preferred embodiment, no more than about 20 ppm of ferric ions cross-link the colloid.

The expression "electrocoagulation printing" as used herein refers to the entire printing process by which an image is reproduced by electrocoagulation of an electrolytically electrocoagulable colloid and the image thus reproduced is transferred onto a substrate, such as paper. The entire printing process thus includes the steps of (a) cleaning the positive electrode surface, (b) coating the latter with an olefinic substance and a metal oxide, (c) filling the electrode gap with the aforementioned colloidal dispersion, (d) electrically energizing selected negative electrodes to form on the olefin and metal oxide-coated positive electrode surface a series of dots of colored, coagulated colloid representative of a desired image, (e) removing any remaining non-coagulated colloid from the positive electrode surface and (f) contacting the dots of colored, coagulated colloid with a substrate to cause transfer of the colored, coagulated colloid onto the substrate The expression "electrocoagulation of the colloid" as used herein refers only to step (d) of the above process, which involves breakdown of the passive oxide film on the positive electrode surface, release of metal ions from the positive electrode surface, coagulation of the colloid and formation of dots of coagulated colloid on the positive electrode surface.

The sequestering agent used is preferably a chelating agent which forms ring structures incorporating the metal ions as central metal atoms. Such a ring formation increases the stability of the metal-chelating agent bonding. A preferred class of chelating agents comprises polyaminocarboxylic acids and their salts which are sold by Ciba-Geigy Corporation under the trade-marks SEQUESTRENE and CHEL. Examples of such polyaminocarboxylic acids include ethylenediaminetetraacetic acid (EDTA), diethylenetriaminepentaacetic acid (DTPA), ethylene-bis (oxyethylenenitrilo)tetraacetic acid (EGTA) and hydroxyethylethylenediaminetriacetic acid (HEDTA). These chelating agents are preferably used in an amount of about 0.01 to about 0.2% by weight, based on the total weight of the ink.

Particularly preferred chelating agents are EDTA and its salts which are readily available at low cost. Where the ink is to be used as a working ink for approximately one hour of printing or as a starting ink for the starting of a continuous printing lasting several hours with intermittent additions of replenishing ink, the EDTA or salt thereof is preferably used in an amount of about 0.01 to about 0.2% by weight, and more preferably in an amount of about 0.1% by weight in the case of a working ink and about 0.02% by weight in the case of a starting ink, based on the total weight of the ink. In the case of a replenishing ink, the EDTA or salt thereof is preferably used in an amount of about 0.02 to about 0.2% by weight and more preferably in an amount of about 0.15% by weight, based on the total weight of the ink.

The colloid generally used is a linear colloid of high molecular weight, that is, one having a weight average molecular weight comprised between about 10,000 and about 1,000,000, preferably between 100,000 and 600,000. Examples of suitable colloids include natural polymers such as albumin, gelatin, casein and agar, and synthetic polymers such as polyacrylic acid, polyacrylamide and polyvinyl alcohol. A particularly preferred colloid is an anionic copolymer of acrylamide and acrylic acid having a molecular weight of about 250,000 and sold by Cyanamid Inc. under the trade-mark ACCOSTRENGTH 86. The colloid is preferably used in an amount of about 6.5 to about 12% by weight, and more preferably in an amount of about 7% by weight, based on the total weight of the ink. Water is preferably used as the medium for dispersing the colloid to provide the desired colloidal dispersion.

The ink also contains a soluble electrolyte. Preferred electrolytes for causing the desired breakdown of the passive oxide film on the positive electrode surface include alkali metal halides and alkaline earth metal halides, such as lithium chloride, sodium chloride, potassium chloride and calcium chloride. The electrolyte is preferably used in an amount of about 6% to about 9% by weight, based on the total weight of the ink.

The ink according to the invention preferably includes a biocidal agent for preventing the growth of fungii, molds and the like. A preferred biocidal agent is the one sold by Gray Products under the trade-mark PARMETOL K-50. The biocidal agent is preferably used in an amount of about 0.1 to about 1% by weight, based on the total weight of the ink.

A preferred ink formulation for use as either a working or starting ink consists essentially of an aqueous colloidal dispersion having a pH of about 4 to about 5 and containing about 60 to about 80% by weight of water, about 6.5 to about 12% by weight of an anionic acrylamide polymer, about 6% to about 9% by weight of an alkali metal chloride, about 6.5 to about 15% by weight of a pigment, about 0.1 to about 2% by weight of an anionic dispersing agent of formula (I) defined above, about 0.01 to about 0.09% by weight of ethylenediaminetetraacetic acid or a salt thereof and about 0.1 to about 1% by weight of a biocidal agent, based on the total weight of the ink. A preferred ink formulation for use as a replenishing ink, on the other hand, consists essentially of an aqueous colloidal dispersion having a pH of about 4 to about 5 and containing about 60 to about 80% by weight of water, about 6% to about 12% by weight of an anionic acrylamide polymer, about 6% to about 9% by weight of an alkali metal chloride, about 6.5 to about 15% by weight of a pigment, about 0.1 to about 2% by weight of an anionic dispersing agent for formula (I), about 0.1 to about 0.2% by weight of ethylenediaminetetraacetic acid or a salt thereof and about 0.1 to about 1% of a biocidal agent, based on the total weight of the ink.

The following non-limiting examples illustrate the invention.

EXAMPLE 1

A cyan colored ink composition useful as a working ink was prepared from the following ingredients:

| | |
|---|---|
| Demineralized water | 72.18 wt. % |
| Hostaperm Blue B2G pigment | 10.49 wt. % |
| Anionic dispersing agent sold under the trade-mark CLOSPERSE 2500 | 1.78 wt. % |
| Anionic acrylamide polymer sold under the trade-mark ACCOSTRENGTH 86 | 6.99 wt. % |
| Potassium chloride | 8.39 wt. % |
| Disodium EDTA dehydrate sold under the trade-mark SEQUESTRENE NA2 | 0.03 wt. % |
| Biocidal agent sold under the trade-mark PARMETOL K-50 | 0.14 wt. % |
| | 100.00 wt. % |

The pigment was first dispersed into the water with the dispersing agent, using a ball grinder. The acrylamide polymer was then added to the resulting dispersion, followed by the addition of the potassium chloride and the biocidal agent. The chelating agent SEQUESTRENE NA2 was thereafter admixed. The aqueous colloidal dispersion thus obtained had a pH of about 4.5.

The above working ink was used in an electrocoagulation printing apparatus of the type described in Applicant's aforementioned U.S. Pat. No. 4,895,629. The viscosity of the ink during electrocoagulation printing was about 360 cp and remained substantially constant for a period of about one hour. The dots of colored, coagulated colloid produced with such an ink had an optical density of 1.45. After transfer of the coagulated colloid onto paper, the colored background formed on the paper had an optical density of 0.02.

EXAMPLE 2

A yellow colored ink composition useful as a starting ink was prepared from the following ingredients:

| | |
|---|---|
| Demineralized water | 71.18 wt. % |
| Permanent Yellow DGR pigment | 11.72 wt. % |
| Anionic dispersing agent sold under the trade-mark CLOSPERSE 2500 | 1.76 wt. % |
| Anionic acrylamide polymer sold under the trade-mark ACCOSTRENGTH 86 | 6.90 wt. % |
| Potassium chloride | 8.28 wt. % |
| Disodium EDTA dehydrate sold under the trade-mark SEQUESTRENE NA2 | 0.02 wt. % |
| Biocidal agent sold under the trade-mark PARMETOL K-50 | 0.14 wt. % |
| | 100.00 wt. % |

A yellow colored ink composition useful as a replenishing ink was also prepared from the following ingredients:

| | |
|---|---|
| Demineralized water | 72.37 wt. % |
| Permanent Yellow DGR pigment | 10.81 wt. % |
| Anionic dispersing agent sold under the trade-mark CLOSPERSE 2500 | 1.62 wt. % |
| Anionic acrylamide polymer sold under the trade-mark ACCOSTRENGTH 86 | 6.36 wt. % |
| Potassium chloride | 8.55 wt. % |

| | |
|---|---|
| Disodium EDTA dehydrate sold under the trade-mark SEQUESTRENE NA2 | 0.15 wt. % |
| Biocidal agent sold under the trade-mark PARMETOL K-50 | 0.14 wt. % |
| | 100.00 wt. % |

Both the starting ink and the replenishing ink were prepared in the same manner as the working ink of Example 1.

The above starting ink was used to start a continuous printing lasting several hours, in the same electrocoagulation printing apparatus as in Example 1. As the level of the ink in the ink feeder diminished, the ink was replenished with the above replenishing ink to maintain a constant ink level. The ink viscosity was about 350 cp and remained substantially constant during the entire printing.

EXAMPLE 3

Example 1 was repeated with the exception that the pigment and the chelating agent in the working ink were respectively Permanent Rubine F6B and EDTA sold under the trade-mark SEQUESTRENE AA. Essentially the same results were obtained.

EXAMPLE 4

Example 1 was repeated with the exception that the pigment and the chelating agent in the working ink were respectively Carbon Black Monarch® 120 and DTPA sold under the trade-mark CHEL DTPA. The amounts of pigment and dispersing agent used were 9.0 wt. % and 0.31 wt. % respectively; the amount of demineralized water was 76.14 wt. %. Essentially the same results were obtained.

We claim:

1. An electrocoagulation printing ink consisting essentially of a liquid colloidal dispersion containing an electrolytically coagulable colloid, a dispersing medium, a soluble electrolyte, a pigment and a dispersing agent uniformly dispersing said pigment into said dispersion, wherein said colloid is a linear colloid having a weight average molecular weight ranging from about 100,000 to about 600,000, and said dispersing agent is an alkali metal salt of a naphthalenesulfonic acid-formaldehyde polycondensate having the general formula:

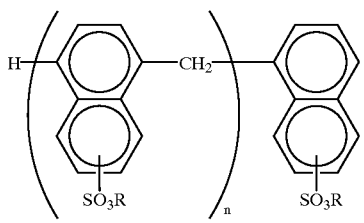

(I)

in which R is an alkali metal and n is an integer ranging from about 5 to about 12.

2. An ink as claimed in claim 1, wherein said pigment is present in an amount of about 6.5 to about 15% by weight, based on the total weight of the ink.

3. An ink as claimed in claim 2, wherein said dispersing agent is present in an amount of about 0.1 to about 2% by weight, based on the total weight of the ink.

4. An ink as claimed in claim 1, wherein said dispersing agent is a naphthalenesulfonic acid-formaldehyde polycondensate alkali metal salt of the formula (I) in which R is sodium and n is 7.

5. An ink as claimed in claim 4, wherein said pigment is a cyan pigment imparting a cyan color to said colloid.

6. An ink as claimed in claim 5, wherein said cyan pigment is present in an amount of about 10% by weight and said dispersing agent is present in an amount of about 2% by weight, based on the total weight of the ink.

7. An ink as claimed in claim 4, wherein said pigment is a magenta pigment imparting a magenta color to said colloid.

8. An ink as claimed in claim 7, wherein said magenta pigment is present in an amount of about 10% by weight and said dispersing agent is present in an amount of about 2% by weight, based on the total weight of the ink.

9. An ink as claimed in claim 4, wherein said pigment is a yellow pigment imparting a yellow color to said colloid.

10. An ink as claimed in claim 9, wherein said yellow pigment is present in an amount of about 12% by weight and said dispersing agent is present in an amount of about 2% by weight, based on the total weight of the ink.

11. An ink as claimed in claim 4, wherein said pigment is a black pigment imparting a black color to said colloid.

12. An ink as claimed in claim 11, wherein said black pigment is present in an amount of about 8% by weight and said dispersing agent is present in an amount of about 0.3% by weight, based on the total weight of the ink.

13. An ink as claimed in claim 1, wherein said colloid is a natural polymer selected from the group consisting of albumin, gelatin, casein and agar.

14. An ink as claimed in claim 1, wherein said colloid is a synthetic polymer selected from the group consisting of polyacrylic acid, polyacrylamide and polyvinyl alcohol.

15. An ink as claimed in claim 14, wherein said synthetic polymer is a polyacrylamide.

16. An ink as claimed in claim 15, wherein said polyacrylamide is present in an amount of about 6.5 to about 12% by weight, based on the total weight of the ink.

17. An ink as claimed in claim 16, wherein the amount of polyacrylamide is about 7% by weight.

18. An ink as claimed in claim 1, wherein said dispersing medium is water and said electrolyte is selected from the group consisting of alkali metal halides and alkaline earth metal halides.

19. An ink as claimed in claim 18, wherein said electrolyte is present in an amount of about 6% to about 9% by weight, based on the total weight of the ink.

20. An ink as claimed in claim 1, further including a sequestering agent for complexing metal ions generated during electrocoagulation printing, said sequestering agent being present in an amount to prevent said metal ions from causing said colloid to undergo undesirable cross-linking, without adversely affecting electrocoagulation of said colloid.

21. An ink as claimed in claim 20, wherein said metal ions are trivalent ions.

22. An ink as claimed in claim 21, wherein said trivalent ions are aluminum or ferric ions.

23. An ink as claimed in claim 22, wherein said trivalent ions are ferric ions and wherein said sequestering agent is present in an amount such that no more than about 20 ppm of ferric ions cause said colloid to cross-link.

24. An ink as claimed in claim 23, wherein said sequestering agent is present in an amount such that no more than about 15 ppm of ferric ions cause said colloid to cross-link.

25. An ink as claimed in claim 20, wherein said sequestering agent is a chelating agent selected from the group consisting of polyaminocarboxylic acids and salts thereof.

26. An ink as claimed in claim 25, wherein said chelating agent is a polyaminocarboxylic acid selected from the group consisting of ethylenediaminetetraacetic acid, diethylenetriaminepentaacetic acid, ethylene-bis(oxyethylenenitrilo)tetraacetic acid and hydroxyethylethylenediaminetriacetic acid, or a salt thereof.

27. An ink as claimed in claim 26, wherein said chelating agent is present in an amount of about 0.01 to about 0.20% by weight, based on the total weight of the ink.

28. An ink as claimed in claim 26, wherein said chelating agent is ethylenediaminetetraacetic acid or a salt thereof.

29. An ink as claimed in claim 28, wherein said chelating agent is present in an amount of about 0.01 to about 0.09% by weight, based on the total weight of the ink.

30. An ink as claimed in claim 29, wherein the amount of said chelating agent is about 0.02% by weight.

31. An ink as claimed in claim 29, wherein the amount of said chelating agent is about 0.03% by weight.

32. An ink as claimed in claim 28, wherein said chelating agent is present in an amount of about 0.02 to about 0.2% by weight, based on the total weight of the ink.

33. An ink as claimed in claim 32, wherein the amount of said chelating agent is about 0.15% by weight.

34. An ink as claimed in claim 1, further including a biocidal agent.

35. An ink as claimed in claim 34, wherein said biocidal agent is present in an amount of about 0.1 to about 1% by weight, based on the total weight of the ink.

36. An electrocoagulation printing ink consisting essentially of an aqueous colloidal dispersion having a pH of about 4 to about 5 and containing about 60 to about 80% by weight of water, about 6.5 to about 12% by weight of an anionic acrylamide polymer, about 6% to about 9% by weight of an alkali metal chloride, about 6.5 to about 15% by weight of a pigment, about 0.1 to about 2% by weight of an anionic dispersing agent, about 0.01 to about 0.2% by weight of ethylenediaminetetraacetic acid or a salt thereof and about 0.1 to about 1% by weight of a biocidal agent, based on the total weight of the ink, wherein said anionic dispersing agent is an alkali metal salt of a naphthalenesulfonic acid-formaldehyde polycondensate having the general formula:

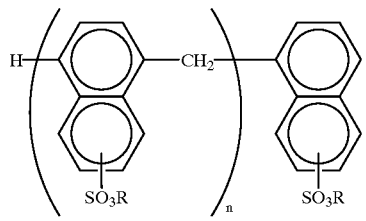

(I)

in which R is an alkali metal and n is an integer ranging from about 5 to about 12.

37. An ink as claimed in claim 36, wherein said dispersing agent is a naphthalenesulfonic acid-formaldehyde polycondensate alkali metal salt of the formula (I) in which R is sodium and n is 7.

38. An ink as claimed in claim 37, wherein said pigment is a cyan pigment imparting a cyan color to said colloid.

39. An ink as claimed in claim 38, wherein said cyan pigment is present in an amount of about 10% by weight and said dispersing agent is present in an amount of about 2% by weight, based on the total weight of the ink.

40. An ink as claimed in claim 37, wherein said pigment is a magenta pigment imparting a magenta color to said colloid.

41. An ink as claimed in claim 40, wherein said magenta pigment is present in an amount of about 10% by weight and said dispersing agent is present in an amount of about 2% by weight, based on the total weight of the ink.

42. An ink as claimed in claim 37, wherein said pigment is a yellow pigment imparting a yellow color to said colloid.

43. An ink as claimed in claim 42, wherein said yellow pigment is present in an amount of about 12% by weight and said dispersing agent is present in an amount of about 2% by weight, based on the total weight of the ink.

44. An ink as claimed in claim 37, wherein said pigment is a black pigment imparting a black color to said colloid.

45. An ink as claimed in claim 44, wherein said black pigment is present in an amount of about 9% by weight and said dispersing agent is present in an amount of about 0.03% by weight, based on the total weight of the ink.

46. An ink as claimed in claim 36, wherein the amount of ethylenediaminetetraacetic acid or salt thereof is about 0.03% by weight.

47. An electrocoagulation printing ink consisting essentially of an aqueous colloidal dispersion having a pH of about 4 to about 5 and containing about 60 to about 80% by weight of water, about 6.5 to about 12% by weight of an anionic acrylamide polymer, about 6% to about 9% by weight of an alkali metal chloride, about 6.5 to about 15% by weight of a pigment, about 0.1 to about 2% by weight of an anionic dispersing agent, about 0.01 to about 0.2% by weight of ethylenediaminetetraacetic acid or a salt thereof and about 0.1 to about 1% of a biocidal agent, based on the total weight of the ink, wherein said anionic dispersing agent is an alkali metal salt of a naphthalenesulfonic acid-formaldehyde polycondensate having the general formula:

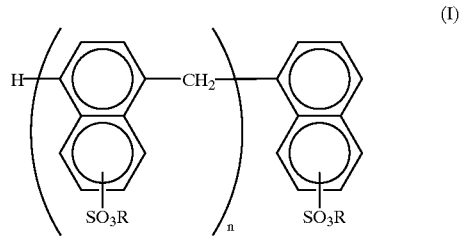

(I)

in which R is an alkali metal and n is an integer ranging from about 5 to about 12.

48. An ink as claimed in claim 47, wherein said dispersing agent is a naphthalenesulfonic acid-formaldehyde polycondensate alkali metal salt of the formula (I) in which R is sodium and n is 7.

49. An ink as claimed in claim 48, wherein said pigment is a cyan pigment imparting a cyan color to said colloid.

50. An ink as claimed in claim 49, wherein said cyan pigment is present in an amount of about 10% by weight and said dispersing agent is present in an amount of about 2% by weight, based on the total weight of the ink.

51. An ink as claimed in claim 48, wherein said pigment is a magenta pigment imparting a magenta color to said colloid.

52. An ink as claimed in claim 51, wherein said magenta pigment is present in an amount of about 10% by weight and said dispersing agent is present in an amount of about 2% by weight, based on the total weight of the ink.

53. An ink as claimed in claim 48, wherein said pigment is a yellow pigment imparting a yellow color to said colloid.

54. An ink as claimed in claim 53, wherein said yellow pigment is present in an amount of about 12% by weight and said dispersing agent is present in an amount of about 2% by weight, based on the total weight of the ink.

55. An ink as claimed in claim 48, wherein said pigment is a black pigment imparting a black color to said colloid.

56. An ink as claimed in claim 55, wherein said black pigment is present in an amount of about 8% by weight and said dispersing agent is present in an amount of about 0.3% by weight, based on the total weight of the ink.

57. An ink as claimed in claim 47, wherein the amount of ethylenediaminetetraacetic acid or salt thereof is about 0.15% by weight.

* * * * *